United States Patent Office 3,480,712
Patented Nov. 25, 1969

3,480,712
PROCESS OF REPELLING RODENTS
Paul F. Thompson, Deer Park, Ohio, assignor to Carlisle Chemical Works, Inc., Reading, Ohio, a corporation of Ohio
No Drawing. Continuation-in-part of application Ser. No. 294,248, July 11, 1963. This application June 8, 1964 Ser. No. 373,526
The portion of the term of the patent subsequent to Mar. 14, 1984, has been disclaimed
Int. Cl. A01n 9/24
U.S. Cl. 424—245                                       13 Claims

ABSTRACT OF THE DISCLOSURE

Rodents are repelled from food and other materials by applying to the environment certain di- or tri-alkyltin compounds.

---

This application is a continuation-in-part of application Ser. No. 294,248, filed July 11, 1963, now Patent 3,309,269, March 14, 1967.

The present invention relates to rodent repellents.

Rodents, such as mice, rats, rabbits and squirrels, are responsible for large financial losses in this country every year. Thus, rodents attack growing trees and other nursery stock, as well as various food plants. The rodent problem is particularly acute in buildings and warehouses which are used for storage of various products, such as seeds and grain. They also cause damage to other stored foodstuffs.

Accordingly, it is an object of the present invention to provide an improved method of repelling rodents.

Another object is to protect growing plants and other materials normally consumed as food by rodents.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from the detailed description.

It has now been found that these objects can be attained by applying to the environment from which the rodents are to be repelled a trialkyltin carboxylate. Suitable compounds have the formula

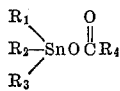

I where $R_1$, $R_2$ and $R_3$ are alkyl radicals having 1 to 8 carbon atoms and $R_4$ is hydrogen, alkenyl, alkyl, aryl, aralkyl, haloalkyl, hydroxyalkyl, thioalkyl or haloaryl. Illustrative compounds which can be employed include tributyltin formate, tributyltin acetate, tributyltin propionate, tributyltin 2-ethylhexoate, tributyltin butyrate, tributyltin stearate, tributyltin benzoate, tributyltin naphthoate, tributyltin 4-methylbenzoate, tributyltin phenylacetate, tributyltin chloroacetate, tributyltin 2-chloropropionate, tributyltin bromoacetate, tributyltin idioacetate, tributyltin fluoroacetate, tributyltin dichloroacetate, tributyltin acrylate, tributyltin methacrylate, tributyltin decanoate, tributyltin neodecanoate, tributyltin 2-chlorobenzoate, tributyltin glycolate, tributyltin 3-hydroxypropionate, trimethyltin butyrate, triethyltin acetate, tripropyltin acetate, propyl dibutyltin acetate, triamyltin acetate, trihexyltin acetate, trioctyltin acetate, triethyltin octoate, trimethyltin benzoate, tributyltin laurate, tripropyltin glycolate and tributyltin oleate.

There also can be used compounds having the formula

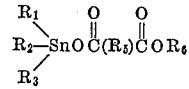

II where $R_5$ is selected from the group consisting of $(CH_2)_n$ where $n$ is 0 or a positive integer, —CH=CH—, and phenylene, $R_6$ is an alkyl group

and $R_1$, $R_2$ and $R_3$ are as previously defined.

Preferably, $R_1$, $R_2$ and $R_3$ do not have over 6 carbon atoms each.

Examples of suitable compounds within formula II are bis (tributyltin) phthalate, bis (tributyltin) maleate, bis (tributyltin) fumarate, bis (tributyltin) oxalate, bis (tributyltin) malonate, bis (tributyltin) succinate, bis (tributylin) glutarate, bis (tributyltin) adipate, bis (tributyltin) sebacate, tributyltin monopropyl fumarate, tributyltin monobutyl maleate, tributyltin monomethyl maleate, tributyltin monodecyl maleate, tributyltin monobutyl adipate, tributyltin monoethyl succinate, tributyltin monobutyl phthalate, tributyltin monoamyl oxalate, trimethyltin monohexyl maleate, triethyltin monoisopropyl adipate, trihexyltin monooctyl glutarate, bis (trimethyltin) phthalate, bis (trimethyltin) maleate, bis (triisopropyltin) adipate, bis (trihexyltin) succinate, ethyldibutyltin monoethyl maleate, bis (tributyltin) monooctadecyl adipate, bis (tributyltin) terephthalate, tributyltin monoethyl isophthalate.

There can also be used compounds of the formula

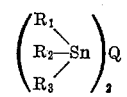

where $R_1$, $R_2$ and $R_3$ are as previously defined and Q is a chalcogen of atomic weight between 16 and 32. Examples of such materials are bis (tributyltin) oxide (TBTO), bis (trioctyltin) oxide, bis (tributyltin) sulfide, bis (trioctyltin) sulfide, bis(trimethyltin) oxide, bis (trimethyltin) sulfide, bis (trihexyltin) oxide and bis (trihexyltin) sulfide.

Additionally, there can be used trialkyltin mercaptoalkanoates such as tributyltin mercaptopropionate, tributyltin mercaptoacetate, trioctyltin mercaptoacetate, trioctyltin mercaptopropionate as well as other sulfur containing tin compounds, e.g., compounds of the formula

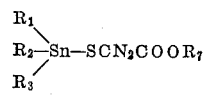

wherein $R_1$, $R_2$ and $R_3$ are as previously defined and $R_7$ is alkyl. Examples of such materials include tributyltin isooctylthioglycolate, trioctyltin isooctylthioglycolate, tributyltin methyl thioglycolate and tributyltin decyl thioglycolate.

Additional trialkyltin compounds which can be used include tributyltin diethyldithiocarbamate, tributyltin dimethyldithiocarbamate, tributyltin dibutyldithiocarbamate, trioctyltin diethyldithiocarbamate, bis (tributyltin) benzaldi (beta-mercaptopropionate), bis (tributyltin) propane-bis (beta-mercaptopropionate) and tributyltin propylene glycol maleate.

In addition to the trialkyltin compounds set forth above there can be used mono and dialkyltin compounds having the formulae

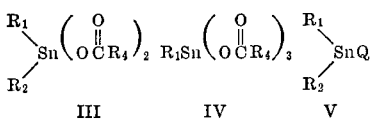

III    IV    V and

VI where $R_1$, $R_2$, $R_3$, $R_4$ and Q are as defined above.
Examples of such materials are dibutyltin bis formate,
monobutyltin triformate,
dibutyltin bis acetate,
monobutyltin triacetate,
dibutyltin bis propionate,
monobutyltin tripropionate,
dibutyltin bis 2-ethylhexoate,
monobutyltin tri 2-ethylhexoate,
dibutyltin bis butyrate,
monobutyltin tributyrate,
dibutyltin bis stearate,
monobutyltin tristearate,
dibutyltin bis benzoate,
monobutyltin tribenzoate,
dibutyltin bis naphthoate,
monobutyltin trinaphthaoate,
dibutyltin bis 4-methylbenzoate,
monobutyltin tri 4-methylbenzoate,
dibutyltin phenylacetate,
monobutyltin tri (phenylacetate),
dibutyltin bis (chloroacetate),
monobutyltin tri (chloroacetate),
monobutyltin tri (2-chloropropionate),
dibutyltin bis (2-chloropropionate),
dibutyltin bis (bromoacetate),
monobutyltin tri (bromoacetate),
dibutyltin bis (iodoacetate),
monobutyltin tri (iodoacetate),
dibutyltin bis (fluoroacetate),
monobutyltin tri (fluoroacetate),
dibutyltin bis (dichloroacetate),
monobutyltin tri (dichloroacetate),
dibutyltin bis acrylate,
monobutyltin triacrylate,
dibutyltin bis methacrylate,
monobutyltin trimethacrylate,
dibutyltin bis decanoate,
monobutyltin tri decanoate,
monobutyltin tri neodecanoate,
dibutyltin bis neodecanoate,
dibutyltin bis 2-chlorobenzoate,
monobutyltin tri 2-chlorobenzoate,
dibutyltin bis glycolate,
monobutyltin tri glycolate,
dibutyltin bis 3-hydroxypropionate,
monobutyltin tri 3-hydroxypropionate,
monobutyltin (tri mercaptopropionate),
monobutyltin tri (mercaptoacetate),
dibutyltin bis (mercaptoacetate),
dibutyltin bis (mercaptopropionate),
dioctyltin bis (mercaptopropionate),
monooctyltin tri (mercaptopropionate),
dibutyltin bis (mercaptoacetate),
dimethyltin bis butyrate,
monomethyltin tributyrate,
diethyltin bis acetate,
monoethyltin triacetate,
dipropyltin bis acetate,
monopropyltin triacetate,
propyl butyltin bis acetate,
diamyltin bis acetate,
monoamyltin triacetate,
dihexyltin bis acetate,
monohexyltin triacetate,
dioctyltin bis acetate,
monooctyltin triacetate,
diethyltin dioctoate,
monoethyltin tri octoate,
dimethyltin dibenzoate,
monomethyltin tribenzoate,
dibutyltin bis laurate,
monobutyltin trilaurate,
dipropyltin bis (glycolate),
monopropyltin tri (glycolate),
dibutyltin bis oleate,
monobutyltin tri oleate,
dibutyltin phthalate,
dibutyltin maleate,
dibutyltin fumarate,
dibutyltin oxalate,
dibutyltin malonate,
dibutyltin succinate,
dibutyltin glutarate,
dibutyltin adipate,
dibutyltin sebacate,
dibutyltin bis (monopropyl fumarate),
monobutyltin tri (monopropyl fumarate),
dibutyltin bis (monobutyl maleate),
monobutyltin tri (monobutyl maleate),
dibutyltin bis (monomethyl maleate),
monobutyltin tri (monomethyl maleate),
dibutyltin bis (monodecyl maleate),
monobutyltin tri (monodecyl maleate),
dibutyltin bis (monobutyl adipate),
monobutyltin tri (monobutyl adipate),
monobutyltin tri (monoethyl succinate),
dibutyltin bis (monoethyl succinate),
dibutyltin bis (monobutyl phthalate),
monobutyltin tri (monobutyl phthalate),
dibutyltin bis (monoamyl oxalate),
monobutyltin tri (monoamyl oxalate),
dimethyltin bis (monohexyl maleate),
monomethyltin tri (monohexyl maleate),
diethyltin bis (monoisopropyl adipate),
monoethyltin tri (monoisopropyl adipate),
dihexyltin bis (monooctyl glutarate),
monohexyltin tri (monooctyl glutarate),
dimethyltin phthalate,
dimethyltin maleate,
diisopropyltin adipate,
dihexyltin succinate,
ethylbutyltin bis (monoethyl maleate),
dibutyltin bis (monooctadecyl adipate),
monobutyltin tri (monooctadecyl adipate),
dibutyltin terephthalate,
dibutyltin bis (monomethyl isophthalate),
monobutyltin tri (monomethyl isophthalate),
dibutyltin oxide,
monobutylstannoic acid,
dioctyltin oxide,
monooctylstannoic acid,
dibutyltin sulfide,
dioctyltin sulfide,
dimethyltin oxide,
dimethyltin sulfide,
dihexyltin oxide,
dihexyltin sulfide,
monohexylstannoic acid,
monomethylstannoic acid.

Additionally, there can be used compounds of the formulae

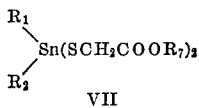

VII and $R_1Sn(SCH_2COOR_7)_3$

VIII where $R_1$, $R_2$ and $R_7$ are as defined above. Examples of such materials include dibutyltin bis (isooctylthioglycolate),
monobutyltin tri (isooctylthioglycolate),
dioctyltin, bis (isooctylthioglycolate),
monooctyltin tri (isooctylthioglycolate),
dibutyltin bis (methylthioglycolate),
monobutyltin tri (methylthioglycolate),
dibutyltin bis (decylthioglycolate), and
monobutyltin tri (decylthioglycolate).

There can also be used compounds such as dibutyltin bis (diethyldithiocarbamate), monobutyltin tris (diethyldithiocarbamate), dibutyltin benzalbis (beta-mercaptopropionate), dibutyltin propane-bis (mercaptopropionate) and cyclic dialkyltin alkoxides such as 2,2-dibutyl-5 - methyl - 1,3-dioxa-2-stannacyclopentane, 2,2-dioctyl-5-methyl - 1,3 - dioxa-2-stannacyclopentane; 2,2-dibutyltin-1,3 - dioxa-2-stannacyclopentane; 2,2-dibutyltin-1,3-dioxa-2 - stannacyclohexane, 2,2 - dibutyl-5-ethyl-1,3-dioxa-2-stannacyclopentane, 2,2 - dibutyl - 4-methyl-1,3-dioxa-2-stannacyclopentane.

The rodent repellents of the present invention, it will be observed, are alkyltin oxides, sulfides, carboxylates, mercaptides, alkoxides and dithiocarbamates.

Many of the above compounds are old. The others can be made in conventional fashion, e.g., by reacting a trialkyltin chloride with an alkali metal salt of the appropriate mono or di carboxylic acid, as shown in Eberly Patent 2,560,034, for example, or by reacting a trialkyltin hydroxide with the appropriate mono or di carboxylic acid or half ester of di carboxylic acid.

The compounds of the present invention were tested for rodent repellency using standard tests.

One test is to mix wheat seeds with the compound to be tested and determine the amount of compound required to repel 50% of the rats, i.e., 50% of the rats tested would not touch the seed.

Another test is to place one tablespoon of a mixture of rolled oats and ground fox chow in a 10 ounce burlap bag 4 inches square and then staple the open end of the bag shut. The bags were offered to the animals for an overnight period of 16 to 18 hours. A bag was considered to be penetrated when the test animal made a hole sufficiently large to obtain the food. Generally, 10 animals were used in each test. The burlap bags were impregnated with various proportions of the test chemicals in order to determine the concentration which would repel 50% of the test animals, i.e., the test animals did not penetrate the bags. The animals used in the test were the house mice (Mus musculus) and the Norway rat.

The results of the test are reported in the following Table 1.

TABLE 1

| Compound | Test animal | Seed $R_{50}$ percent | Burlap $R_{50}$ mg./in.$^2$ |
| --- | --- | --- | --- |
| Tributyltin acetate | House mice | 0.11 | 2 |
| Do | Norway rat | | 1 |
| Tributyltin benzoate | House mice | 0.03 | |
| Tributyltin formate | do | 0.04 | |
| Tributyltin glycolate | do | 0.03 | |
| Tributyltin chloroacetate | do | 0.13 | |
| Tributyltin 2-ethylhexoate | do | 0.10 | |
| Tributyltin neodecanoate | do | 0.08 | |
| TBTO | do | 0.03 | 6.2 |

In the table $R_{50}$ indicates that 50% of the test animals were repelled and mg./in.$^2$ signifies milligrams per square inch.

In the burlap bag test with the Norway rat ½ as much tributyltin acetate was required to repel the rats as was required with tributyltin chloride. When house mice were the test animals there was needed only approximately ½ as much tributyltin acetate as tributyltin chloride.

The compounds of the present invention are applied to the environment from which the rodents are to be repelled. Thus, they are applied to bags or boxes containing seeds, e.g., wheat, oat, corn or barley, or other foodstuffs, e.g., sugar, potatoes, fruits, lettuce, carrots, etc. They also can be applied to the floors of warehouses and other buildings.

It is not necessary to apply the tin compounds to the foodstuff or seed itself since application to the container or the floors of the building containing the foods or seed is adequate to insure rodent repellency.

The compounds can be dusted on the warehouse floor or container or they can be applied from a dispersion in a volatile solvent, e.g., a hydrocarbon such as pentane, hexane, or a ketone such as acetone or methyl ethyl ketone.

Another test which was employed was an initial screening test for food acceptance. To determine the activity of the organotin compound an acetone solution of the compound was used to coat 25 white wheat seeds at a 1% concentration. Ten individually caged house mice were each offered 25 of the prepared wheat seeds during an 18 hour period. At the conclusion of the period, an inspection was made to determine the percentage of animals that were repelled by the organotin compound treatment. Table 2 records the results of such tests and indicates how many of the 10 mice tested were repelled for each compound.

TABLE 2

| Compound: | No. of mice repelled |
| --- | --- |
| Bis (tributyltin) oxide (TBTO) | 10 |
| Tributyltin propylene glycol maleate | 10 |
| Tributyltin acetate | 9 |
| Bis (tributyltin) mercaptopropionate | 10 |
| Tributyltin benzoate | 10 |
| Tributyltin hydroxyacetate | 10 |
| Tributyltin propionate | 10 |
| Tributyltin formate | 10 |
| Tributyltin neodecanoate | 10 |
| Tributyltin 2-ethylhexanoate | 10 |
| Tributyltin chloroacetate | 10 |
| Dibutyltin bis acetate | 10 |
| Tributyltin isooctylthioglycolate | 10 |
| Tributyltin diethyldithiocarbamate | 10 |
| Bis (tributyltin) benzal bis (betal-mercaptopropionate) | 10 |
| Bis (tributyltin) propane-bis (beta-mercaptopropionate) | 10 |
| Dibutyltin bis benzoate | 9 |
| Dibutyltin bis 2-ethylhexanoate | 9 |
| Dibutyltin bis laurate | 10 |
| Dibutyltin bis neodecanoate | 7 |
| Dibutyltin bis stearate | 10 |
| Dibutyltin sulfide | 10 |
| 2,2-dibutyl-5-methyl-1,3-dioxa - 2 - stannacyclopentane | 10 |

I claim:

1. A process of repelling rodents comprising applying to the environment from which the rodents are to be repelled an effective amount of a tri lower alykltin oxide.

2. A process according to claim 1 wherein the trialkyltin oxide is tributyltin oxide.

3. A process of repelling rodents comprising applying to the environment from which the rodents are to be repelled an effective amount of a di lower alkyltin bis alkanoate.

4. A process according to claim 3 wherein the alkyl groups have 1 to 6 carbon atoms.

5. A process according to claim 4 wherein the dialkyltin bis alkanoate is dibutyltin bis acetate.

6. A process of repelling rodents comprising applying to the environment from which the rodents are to be repelled an effective amount of a di lower alkyltin oxide.

7. A process of repelling rodents comprising applying to the environment from which the rodents are to be repelled an effective amount of a di lower alkyltin sulfide.

8. A process of repelling rodents comprising applying to the environment from which the rodents are to be repelled an effective amount of a di lower alkyltin bis benzoate.

9. A process of repelling rodents comprising applying to the environment from which the rodents are to be repelled an effective amount of a di to tri lower alkyltin alkyl thioglycolate.

10. A process of repelling rodents comprising applying to the environment from which the rodents are to be repelled an effective amount of a di to tri lower alkyltin mercaptoalkanoate.

11. A process of repelling rodents comprising applying to the environment from which the rodents are to be repelled an effective amount of a di lower alkyltin bis glycolate.

12. A process of repelling rodents comprising applying to the environment from which the rodents are to be repelled an effective amount of a di lower alkyltin bis chloroacetate.

13. A process of repelling rodents comprising applying to the environment from which the rodents are to be repelled an effective amount of a 2,2-di lower alkyl 1,3-dioxa-2-stannacyclopentane.

References Cited

UNITED STATES PATENTS 3,309,269  3/1967  Thompson _____ 167—46

OTHER REFERENCES

Chemical Absts. I, 52 1958, p. 20691d.
Chemical Absts. II 54 1960, p. 4895.
Chemical Absts. III, 52 1958, p. 20659.
Chemical Absts. IV, 52 1958, p. 9415.

ALBERT T. MEYERS, Primary Examiner

F. E. WADDELL, Assistant Examiner

U.S. Cl. X.R.
424—288, 328, 335